United States Patent

[11] 3,555,249

[72] Inventor Richard W. Ahrons
Somerville, N.J.
[21] Appl. No. 694,155
[22] Filed Dec. 28, 1967
[45] Patented Jan. 12, 1971
[73] Assignee RCA Corporation
a corporation of Delaware

[54] SELF-CORRECTING SHIFT COUNTER
3 Claims, 1 Drawing Fig.

[52] U.S. Cl. .................................................. 235/92, 235/153, 328/48
[51] Int. Cl. .................................................. H03k 23/02
[50] Field of Search .......................................... 328/48, 49; 235/92, 153; 307/221; 340/146.1

[56] References Cited

UNITED STATES PATENTS

| | | | |
|---|---|---|---|
| 2,972,718 | 2/1961 | Alperin et al. ................ | 328/48 |
| 3,064,890 | 11/1962 | Butler .......................... | 328/48X |
| 3,178,586 | 4/1965 | Rosenfeld ...................... | 328/48X |
| 3,456,200 | 7/1969 | Bos .............................. | 328/48 |

OTHER REFERENCES

Fairchild Semi-Conductor Application Bulletin app. 85/3, "Micrologic Shift-Counter Integrated Circuits" by G. Powers November 1966

*Primary Examiner*—Maynard R. Wilbur
*Assistant Examiner*—Charles D. Miller
*Attorney*—H. Christoffersen

ABSTRACT: A counter which is capable of counting in several closed-loop counting cycles and means for sensing certain bits which are of the same value at least once in all counting cycles for placing in the counter a count which is unique to only one of the counting cycles.

PATENTED JAN 12 1971 3,555,249
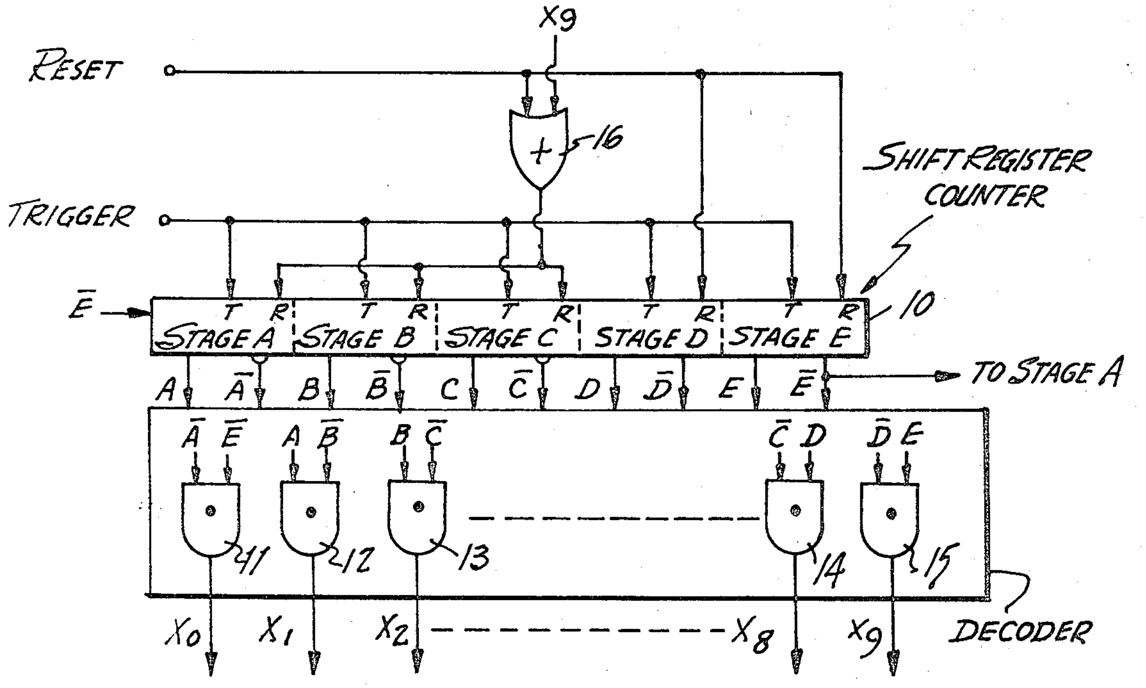
INVENTOR
RICHARD W. AHRONS
BY Samuel Cohen
ATTORNEY

SELF-CORRECTING SHIFT COUNTER

BACKGROUND OF THE INVENTION

The invention described herein was made in the performance of work under a NASA contract and is subject to the provisions of s Section 305 of the National Aeronautics and Space Act of 1958, Public Law 85–568 (72 Stat. 435; 42 U.S.C. 2457).

In certain types of counters, operation is possible in a desired or in one or more undesired or anomalous counting cycles. If the counter initially is operating in its desired operating cycle, noise or other transients, sudden changes in power supply voltages, or other changes in operating conditions can cause the counter to switch into an anomalous counting cycle. Once there, it remains there, continuously cycling through the successive counting states of the anomalous counting cycle. This, of course, is highly undesirable and results in improper operation of the system of which the counter is a part.

The object of this invention is to provide, for a counter of the above type, a means for automatically sensing when the counter is in an anomalous counting state and, in response thereto, for placing the counter back into a desired counting state.

SUMMARY OF THE INVENTION

In the circuit of the invention, the outputs of at least two of the stages of a counter are sensed. The portion of the count produced at these two stages has a common value during some point in all counting cycles, both desired and anomalous. In response to this count, the counter is set to a count which is present only in the desired counting cycle.

BRIEF DESCRIPTION OF THE DRAWING

The single FIG. is a block circuit diagram of a preferred form of the invention.

DETAILED DESCRIPTION

The counter 10 shown in FIG. 1 is simply a shift register with the inverted output of the last stage serving as an input to the first stage. Without such feedback, each time a trigger pulse occurs, whatever count happens to be stored in the shift register is advanced one stage. With the feedback as described, each time a trigger pulse occurs, the complement of the bit stored in the last stage is applied to and then stored in the first stage. All of this is well understood in the art.

In a five-stage counter, if the counter initially is reset so that it stores ABCDE = 00000, in response to the first trigger pulse, the 0 present in the last or E stage is fed back as a 1 and is stored in the first or A stage. In response to the second trigger pulse, the 0 present at the last stage is fed back and stored as a 1 in the first or A stage and the 1 previously present in the A stage is shifted into the B stage. Table I shows the complete counting cycle.

It may be observed from the table above that the five-stage counter shown generates 10 different counts 0 through 9 and,

TABLE I

| Desired count | | | | | Decimal | Inputs to decoder |
|---|---|---|---|---|---|---|
| A | B | C | D | E | | |
| 0 | 0 | 0 | 0 | 0 | 0 | $\overline{EA}$ |
| 1 | 0 | 0 | 0 | 0 | 1 | $A\overline{B}$ |
| 1 | 1 | 0 | 0 | 0 | 2 | $B\overline{C}$ |
| 1 | 1 | 1 | 0 | 0 | 3 | $C\overline{D}$ |
| 1 | 1 | 1 | 1 | 0 | 4 | $D\overline{E}$ |
| 1 | 1 | 1 | 1 | 1 | 5 | EA |
| 0 | 1 | 1 | 1 | 1 | 6 | $\overline{A}B$ |
| 0 | 0 | 1 | 1 | 1 | 7 | $\overline{B}C$ |
| 0 | 0 | 0 | 1 | 1 | 8 | $\overline{C}D$ |
| 0 | 0 | 0 | 0 | 1 | 9 | $\overline{D}E$ |
| 0 | 0 | 0 | 0 | 0 | 0 | |

in response to the next pulse, generates the 0 count again. An important advantage of this type of counter is that the code which is generated is a so-called gray code. In other words, each succeeding code is changed by only one digit. Moreover, as is clear from observation, the code is symmetrical and this is useful in many applications.

A further feature in a counter of the above type is that the count produced is relatively easy to decode and requires only decoders of the two input-type. The FIG. shows, in part, a suitable decoder. It includes 10 AND gates, however, only five of them 11—15 are shown. The first gate 11 produces an output $X_0$=1 when A =0 and E =0. It may be observed from the table that this occurs only at the count for decimal 0. The second gate 12 produces an output when A =1 and B =0. This occurs only at the count for the decimal 1. The inputs for these and for all of the remaining gates of the decoder are given in Table I.

Unfortunately, in the operation of a shift register counter of the type discussed above, it sometimes occurs that due to noise or some other undesired operating condition, a count appears in the counter which is different than one of the 10 counts listed in Table I. (It is to be understood, of course, that since there are five stages in the counter, there are a total of $2^5$ or 32 different counts which are possible.) If a different count should become established in the counter, it will not, in due course, revert to one of the counts in the cycle of Table I. Instead, it will cause the counter to switch into a different, close-loop counting cycle. In other words, once an anomalous count is established in a shift register counter, it will cause the counter continuously to cycle through an anomalous counting cycle.

For example, suppose that the count ABCDE =00010, which is not present in the desired counting cycle, becomes established in the counter. In response to the first trigger pulse, the count will change to 10001 (the last or E digit is inverted and the inverted digit becomes the first or A digit). Note that this count also is not present in the desired counting cycle of Table I. In response to the next trigger pulse, the count changes to 01000. This count is not present in the desired counting cycle of Table I either.

Table II below lists all of the counts (a total of 22) other than those of Table I which it is possible for the counter 10 to produce.

TABLE II

| Anomalous count, AC-1 | | | | | | Anomalous count, AC-2 | | | | | | Anomalous count, AC-3 | | | | | |
|---|---|---|---|---|---|---|---|---|---|---|---|---|---|---|---|---|---|
| A | B | C | D | E | Number | A | B | C | D | E | Number | A | B | C | D | E | Number |
| 0 | 0 | 0 | 1 | 0 | 0 | 0 | 0 | 1 | 0 | 0 | 0 | 0 | 1 | 0 | 1 | 0 | 0 |
| 1 | 0 | 0 | 0 | 1 | 1 | 1 | 0 | 0 | 1 | 0 | 1 | 1 | 0 | 1 | 0 | 1 | 1 |
| 0 | 1 | 0 | 0 | 1 | 2 | 1 | 1 | 0 | 0 | 1 | 2 | 0 | 1 | 0 | 1 | 0 | 0 |
| 1 | 0 | 1 | 0 | 0 | 3 | 0 | 1 | 1 | 0 | 0 | 3 | | | | | | |
| 1 | 1 | 0 | 1 | 0 | 4 | 1 | 0 | 1 | 1 | 0 | 4 | | | | | | |
| 1 | 1 | 1 | 0 | 1 | 5 | 1 | 1 | 0 | 1 | 1 | 5 | | | | | | |
| 0 | 1 | 1 | 1 | 0 | 6 | 0 | 1 | 1 | 0 | 1 | 6 | | | | | | |
| 1 | 0 | 1 | 1 | 1 | 7 | 0 | 0 | 1 | 1 | 0 | 7 | | | | | | |
| 0 | 1 | 0 | 1 | 1 | 8 | 1 | 0 | 0 | 1 | 1 | 8 | | | | | | |
| 0 | 0 | 1 | 0 | 1 | 9 | 0 | 1 | 0 | 0 | 1 | 9 | | | | | | |
| 0 | 0 | 0 | 1 | 0 | 0 | 0 | 0 | 1 | 0 | 0 | 0 | | | | | | |

Note that these 22 counts form three different anomalous counting cycles, legended AC–1, AC–2, and AC–3.

The present invention makes use of the property that in the 32 different counts which are possible, there are certain bits in the anomalous and in the desired counting cycles which, at some point in the respective counting cycles, have precisely the same value. For example, the bits DE have the value 01 at count 9 of the desired counting cycle at counts 1, 5 and 9 of the anomalous counting cycle AC–1, at counts 2, 6 and 9 of the anomalous counting cycle AC–2 and at count 1 of the anomalous counting cycle AC–3. (The DE bits of interest are shown within dashed rectangles in Tables I and II.) These bits are sensed and the signal produced when they have the value $\overline{D}E = 1$ is used to change the count stored in the counter from an anomalous count to one which is unique to the desired counting cycle, if the count happens to be anomalous. However, the count is not disturbed if it happens to be in the desired counting cycle.

The circuit for accomplishing the above is shown in the FIG. It comprises an OR gate 16 through which the signal indicative of the bit $X_9$ is applied to the reset terminals of the first three stages. The bit $X_9$ is the output of the decoder gate 15 and it has the value 1 only when D=0 and E=1.

If $\overline{D}E = 1$ occurs at the count ABCDE =00001, a count which is in the desired counting cycle, then the signal indicative of the bit 1 produced by OR gate 16 does not affect the circuit operation. The reason is that the first three stages are already in the O state (defined as that state when the unbarred output, such as A, represents the bit O and the barred output, such as $\overline{A}$, the bit 1) and the reset pulse $X_9 = 1$ only tends to maintain these stages in the reset state. However, if the count sensed happens to be, for example, ABCDE =11101 (count 5 in anomalous counting cycle AC–1) then the $X_9 = 1$ pulse resets the first three stages of the counter and the stored count changes to ABCDE =00001 (count 9 in the desired counting cycle).

A feature placing the counter in the desired counting state in the way discussed above is that a "race" condition is not possible. During the interval the count produced by the last two stages is sensed by decoder 15, the $X_9$ signal may change the state of one or more of the first three stages of the counter. But, if the Tables above are examined, it will be seen that doing this has no effect on the information stored in the last two stages. Therefore, this is a stable way of changing the count from a count in an anomalous counting cycle to a count in the desired counting cycle without the possibility of oscillations, that is, a race condition, occuring.

The reset signal is employed initially to reset the counter 10 to the count of 00000. It is applied directly to the reset terminals of the last two stages D and E and through the OR gate 16 to the reset terminals of the first three stages A, B and C.

While the invention has been illustrated in terms of a five-stage counter, it is to be understood that the invention is applicable to a counter of any number of stages greater than or less than five in which the problem of anomalous counting cycles exists. The components employed to make up the register are not illustrated, as the actual circuits themselves are not important to the present invention. For example, this invention may be operated with a shift register made up of MOS (metal oxide semiconductor) transistors (the register stages may be "Counter Flip-Flop" RCA type TA5362, as described in a data sheet published by RCA, Harrison, N.J., in Oct., 1967) and the decoder also may employ MOS transistors. However, other circuit elements may be used instead. It also should be mentioned that while the decoder is illustrated as an AND gate decoder, other types of decoder gates such as NOR gates may be used instead.

While the invention has been illustrated using a 0 in the next to the last stage and a 1 in the last stage, any two adjacent stages may be used. The detection of a 01 or a 10 may be used. When a signal is obtained sensing the 01 or the 10, the preceding and following stages must be reset leaving the two sensed stages unchanged. If a 01 is sensed, the preceding stages are reset to 0 and the succeeding stages are set to a 1. If a 10 is sensed, the preceding stages are set to 1 and the following stages are reset to 0. In addition, the first and last stage can be used by detecting a 11 and setting all remaining stages to 1 and by detecting a 00 and resetting all remaining stages to 0.

I claim:

1. In combination:

a multiple stage shift counter which is capable of counting in one desired and in at least one anomalous counting cycle; and means for sensing a count having certain bits of the same value in both the desired and the anomalous counting cycle for changing the count, it is in any anomalous counting cycle always, directly to a particular count in the desired counting cycle and for not disturbing the count, if it is in the desired counting cycle.

2. The combination set forth in claim 1 wherein said shift counter comprises a shift-register and a feedback circuit connected between the last and first stages of said register for feeding back to the first stage the complement of the bit stored in the last stage.

3. The combination set forth in claim 1 wherein the last-named means comprises a decoder gate receptive of the outputs of at least two but less than all of the stages of said shift counter, and means responsive to an output produced by said decoder gate for resetting a plurality of the stages of said counter.

UNITED STATES PATENT OFFICE

CERTIFICATE OF CORRECTION

Patent No. 3,555,249 Dated January 12, 1971

Inventor(s) Richard W. Ahrons

It is certified that error appears in the above-identified patent and that said Letters Patent are hereby corrected as shown below:

Column 4, line 36 After the "comma" and before "it" insert --if--

Signed and sealed this 6th day of April 1971.

(SEAL)
Attest:

EDWARD M.FLETCHER, JR.
Attesting Officer

WILLIAM E. SCHUYLER, JR.
Commissioner of Patents